May 2, 1961     D. S. CRUICKSHANK     2,982,326
TIRE CHAIN TIGHTENER

Filed Dec. 12, 1958

INVENTOR.
DAVID S. CRUICKSHANK
BY
*Barlow & Barlow*
ATTORNEYS

United States Patent Office 2,982,326
Patented May 2, 1961

2,982,326

TIRE CHAIN TIGHTENER

David S. Cruickshank, Warwick, R.I.
(P.O. Box 207, Hopatcong, N.J.)

Filed Dec. 12, 1958, Ser. No. 779,972

4 Claims. (Cl. 152—219)

This invention relates to a tire chain tightener of the type which may be used for reducing the encircling size of the tire chain after applied to the wheel and tire of a motor vehicle.

One of the objects of this invention is to provide a simple device which may be used for shortening the effective length of the lengthwise extending chain of a tire chain.

Another object of the invention is to provide a device several of which may be used for shortening to a predetermined extent the length of the chain.

Another object of the invention is to provide a device which will be extremely simple in construction and simple in operation.

Another object of the invention is the positive anchoring of the tire chain tightening device against loosening through the action of centrifugal force when the wheel with tire chain thereon is rotating.

With these and other objects in view, the invention consists of certain novel features of construction as will be more fully described and particularly pointed out in the appended claims.

Figure 1:
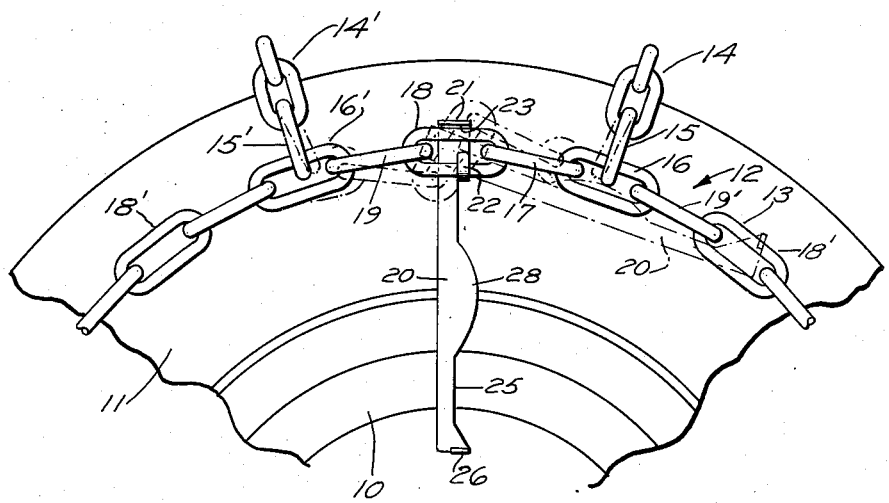
Figure 1 is an elevation of a fragmental portion of a wheel and tire with a tire chain applied thereto and with the device of this invention shown in full lines as attached in initial position on the chain and as shown in dotted lines in the position which it will assume in tightening the chain.
Figure 2:
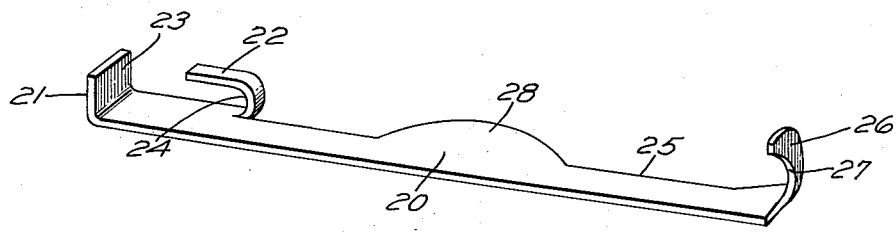
Figure 2 is a perspective view of the device itself.

In proceeding with this invention, I utilize a blade-like member which will be rather stiff and rigid and usually metal which will be sufficiently thin to be tucked between the tire chain and the tire when in operation without excessively bulging the portion of the chain along which it extends. Some gripping means is provided at one end of this member and some means for attaching the other end of the member to a spaced portion of the tire chain so that when the member is put on one of the links and turned through an arc of a circle, the link may be disposed at an angle to its normal extent and thereby shorten the effective length of the chain.

With reference to the drawings, 10 designates the wheel of a motor vehicle upon which there is positioned a tire 11. Upon this tire there is shown a tire chain designated generally 12 which comprises lengthwise extending chains 13 one which is shown on the front side of the wheel in Figure 1 and the other of which is on the back side of the wheel but is hidden in this view. Between these lengthwise extending chains, there are a plurality of cross chains 14, 14' which are connected to the lengthwise extending chains at spaced intervals. In the drawing the end link 15 of the cross chain 14 is shown as attached to the link 16 of the lengthwise extending chains, while the end link 15' of the cross chain 14' is shown as attached to the link 16' of the lengthwise extending chains. Between these links 16 and 16' there are usually located three links similar to the links 16 and 16', these links being designated 17, 18 and 19. It is to the middle link 18 of this group that the device of this invention is applied which is the middle link between two cross chains.

The device of this invention comprises an elongated member 20 which is generally blade-like having a width several times its thickness, thus giving it rigidity in the plane of its wide dimension. This member is usually formed of metal, although any material which will provide the proper rigidity and stamina against use may be utilized.

The member 20 has a flange 21 at one end which is usually formed by turning or bending the end of the member at generally right angles to the plane of the member 20. The extent of this flange will be substantially the thickness of the link 18. In order to secure this member to the link, I have cut the member 20 and bent up an arm 22 substantially back upon itself at such a location that the space between the inner surface 23 of the flange 21 and the inner arc 24 of the arm 22 will be substantially the width of the link. This member 20 is also cut away as at 25 so as to receive the link 19' of the next group of links between cross links.

The opposite end of the member 20 is bent at right angles and is formed into a hook 26 with an arcuate portion 27 so as to engage the link 18' of the next group of links. The intermediate portion 28 of this machine 20 is shaped to give strength and also to provide a smooth curvature for fitting back of the links of the chains when applied to the tire. When the member is attached as in the full line position shown in Figure 1 and then swung counter clockwise as seen in Figure 1 to the dotted line position, the hook 26 will extend over the link 18' with the blade-like member 20 positioned between the lengthwise chain 13 and the tire so as to dispose the link 18 in the dotted line position and cause the links 17 and 19 to be drawn toward each other and consequently shorten the lengthwise extent of the chain 13, which also moves the cross chains 14 and 14' slightly closer together as also indicated in dotted lines. By this construction the member may be applied along the outer face of the chain instead of between the tire and the chain as above described and in this instance the rotation will be clockwise as seen in Figure 1.

I claim:

1. In combination with a tire chain having lengthwise extending chains and cross chains attached to the links of said lengthwise chains at spaced intervals, an elongated member one end of which is secured to a link of the lengthwise chain located between the links attached to the cross chains for turning the link out of longitudinal alignment with the links to which it is connected for shortening the effective length of the lengthwise extending chain and means spaced from the secured end of the elongated member for grasping another link of the tire chain and positively holding said elongated member in the position to which it is turned to maintain the shortening effect thereof.

2. The combination of claim 1 wherein said means is a hook adjacent on the other end of elongated member to engage the lengthwise chain at a point spaced from the link to which the elongated member is secured.

3. The combination of claim 1 wherein said elongated member is secured to the link by portions of the elongated member being bent to partially embrace the link of the chain.

4. An independent tool adapted to be used as a tire chain tightener comprising a blade member having a width greater than its thickness provided at one end with a transverse flange extending generally right angularly to the blade member substantially the thickness of a tire chain link with which it is to be used for partially embracing one side bar of the link, and an arm spaced from the flange of the blade member and extending toward said flange for embracing the other side bar of a tire chain link, and a hook at the opposite end of said member and extending laterally therefrom to engage a link of the tire chain whereby when the embracing portion rotates the embraced link angularly of its lengthwise extent the chain is shortened.

References Cited in the file of this patent

UNITED STATES PATENTS

| | | |
|---|---|---|
| 1,338,626 | Hodges | Apr. 27, 1920 |
| 1,439,096 | Golphin | Dec. 19, 1922 |
| 2,067,032 | Weed | Jan. 5, 1937 |
| 2,324,463 | Brady | July 20, 1943 |